United States Patent [19]

Hazumi et al.

[11] 4,208,710
[45] Jun. 17, 1980

[54] VOLTAGE REGULATING DEVICE FOR POWER GENERATING SYSTEM

[75] Inventors: Kenji Hazumi, Sakato; Tsutomu Tanaka, Kasakake; Katsutoshi Tagami, Asaka, all of Japan

[73] Assignees: Sawafuji Electric Co. Ltd; Honda Giken Kogyo Kabushiki Kaisha, both of Tokyo, Japan

[21] Appl. No.: 910,231

[22] Filed: May 30, 1978

[30] Foreign Application Priority Data

Jun. 17, 1977 [JP] Japan .................................. 52-71691
Jun. 17, 1977 [JP] Japan .................................. 52-71692

[51] Int. Cl.$^2$ ......................................... H02M 7/515
[52] U.S. Cl. .................................... 363/96; 363/136
[58] Field of Search .................................. 363/56–58, 363/96, 132, 136; 307/252 F

[56] References Cited

U.S. PATENT DOCUMENTS 3,378,751  4/1968  Walker ............................... 363/72 X
3,694,669  9/1972  Witt et al. .......................... 307/252 F Primary Examiner—William M. Shoop

[57] ABSTRACT

A voltage regulating device for a power generating system with inverter circuits including two sets of switching elements each of which is alternately on-off controlled, having delay circuits for controlling delay time in accordance with the load voltage, and characterized in that supply voltage to the load is maintained at a constant level by forcibly turning off either set of the switching elements during the period when the said set of the switching elements are to be turned on.

5 Claims, 13 Drawing Figures

FIG. 3C PULSE G1,G4

FIG. 3D PULSE, G3,G2

FIG. 3E TERMINAL VOLTAGE

FIG. 3F PULSE G1

FIG. 3G PULSE G3

VOLTAGE REGULATING DEVICE FOR POWER GENERATING SYSTEM

BACKGROUND OF THE INVENTION

1. Field of the Invention

This invention relates generally to a voltage regulating device for a power generating system, and more specifically to a voltage regulating device for a power generating system which is required to be of smallest possible size and to have a high output, such as a portable engine generator, wherein the output can be fed to the load via the inverter, the supply voltage can be maintained at a constant level and the construction can be simplified to achieve cost reduction. 2. Description of the Prior Art A description of an engine generator will be made in what follows as an example of this invention though it is not intended to limit the scope of this invention. An engine generator is usually constructed so that it can drive a load at 50 Hz or 60 Hz. In such an engine generator, a high output can be generated by increasing the revolution of the engine and/or increasing the field windings, as is well known. However, there is a limit in increasing the field windings. It may be fairly said, therefore, that the magnitude of output is determined by the revolution of the engine.

However, the output frequency of the generator itself is determined by the revolution of the engine. In a 2-pole generator, for example, which is directly connected to the engine, the revolution of the engine has to be set at 3,000 rpm in order to drive the load at 50 Hz, or at 3,600 rpm to drive the load at 60 Hz.

In a portable engine generator, for example, which is required to be of smallest possible size and yet to produce a high output, a construction has been devised in which higher output is obtained by setting the revolution of the engine at 5,000 rpm or 6,000 rpm, for example, and the rectified output is converted into the desired frequency, say, 50 Hz or 60 Hz using an inverter circuit. Moreover, in such an engine generator, a constant voltage control means is usually provided for maintaining supply voltage to the load as constant as possible.

However, in conventional engine generators having such a constant voltage control device and a multi-voltage changeover device to permit the generator to be used in various countries in the world, the constant voltage control device and the multivoltage changeover device are separately constructed. This often makes the construction relatively complicated, resulting in higher cost.

SUMMARY OF THE INVENTION

It is an object of this invention to provide a voltage regulating device for a power generating system required to be of smallest possible size and to produce high output which can maintain supply voltage to the load at a constant level simply by adding a circuit of simple construction to the inverter circuit.

It is another object of this invention to provide a voltage regulating device for a power generating system, which can set the load voltage to the desired load driving voltage level and can maintain the respective load voltages at a constant level.

It is still another object of this invention to provide a voltage regulating device for a power generating system, which can simplify the construction of the voltage regulating device and can achieve cost reduction.

BRIEF DESCRIPTION OF THE DRAWINGS

FIGS. 3a through 3k are diagrams of assistance for explaining a specific operating timing of the major circuit components in FIG. 1.

DETAILED DESCRIPTION OF THE INVENTION

Figure 1:
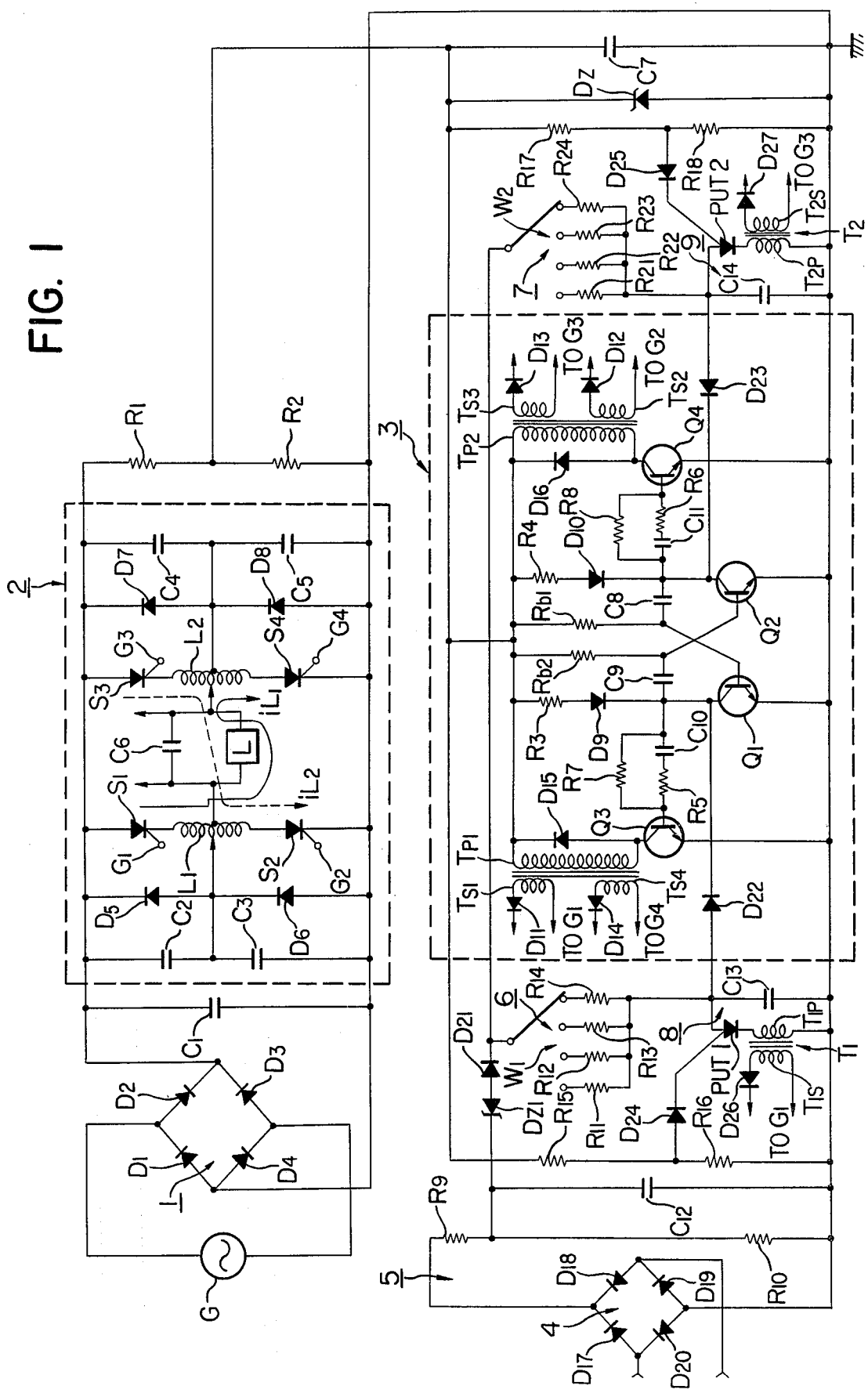
FIG. 1 is a schematic circuit diagram illustrating an embodiment of this invention.

FIG. 1 is a schematic circuit diagram of a voltage regulating device embodying this invention. In the figure, the a-c output of a generator unit G consisting of a mobile engine generator the engine revolution of which was set at 5,000 rpm or 6,000 rpm, for example, to produce a large output in a smallest possible unit is connected between the input terminals of a first bridge rectifier circuit 1 composed of four diodes. A smoothing capacitor C1 and a bridge type thyristor inverter circuit 2 of such a construction as described later are connected in parallel between the output terminals of the rectifier circuit 1. That is, this inverter circuit 2 has such a construction that two sets of the same circuits are connected in parallel between the output terminals of the abovementioned rectifier circuit 1, each set of the circuits consisting of a parallel circuit having two series-connected capacitors C2-C3 (C4-C5) for halving the power source voltage, two series feedback diodes D5-D6 (D7-D8) of the polarity shown in the figure, and two switching elements, or thyristors S1-S2 (S3-S4), having a main current path of forward connection provided across a commutating reactor L1 (L2). The connection points at which the capacitors for halving the power source voltage and the feed-back diodes of each set of the circuit are connected to the center tap terminal of the commutating reactor of each set, and a parallel circuit consisting of a load L and a smoothing capacitor C6 is connected between the center tap terminals of the commutating reactors L1 and L2.

On the other hand, an astable multivibrator circuit 3 of the following construction is provided as a trigger control source for alternately trigger controlling the gate electrodes G1 through G4 of thyristors S1 through S4 included in the inverter circuit 2 at a desired frequency such as 50 Hz or 60 Hz. That is, this multivibrator 3 is powered by a constant voltage power supply obtained by connecting a smoothing capacitor C7 and a constant voltage diode Dz in parallel between the connection of two series resistors R1 and R2 of a voltage dividing circuit, which are connected between the output terminals of the rectifier circuit 1, and includes a pair of npn type grounded emitter transistors Q1 and Q2 each collector of which is connected to the cathode side terminal of the constant voltage diode Dz via a series circuit consisting of resistor R3 (R4) (in the middle of the figure) and diode D9 (D10) connected in forward direction. Each of the bases of these transistors Q1 and Q2 is connected to the collector of the counterpart transistors Q2 and Q1, respectively, and to the positive side terminal of the abovementioned constant voltage supply via base resistors Rb1 and Rb2. In order to increase the level of the oscillation output voltage produced by the transistors Q1 and Q2 to an appropriate level as necessary, a pair of npn type grounded emitter transistors Q3 and Q4 are provided, each base of which is connected to each collector of the transistors Q1 and Q2 via a parallel circuit of a series circuit of a capacitor C10 (C11) and a resistor R5 (R6) and a resistor R7 (R8), as shown in the figure. Furthermore, collector output windings $T_{p1}$ and $T_{p2}$ are connected each between the collectors of the transistors Q3 and Q4 and the positive terminal of the power supply, and secondary windings $T_{s1}$ and $T_{s4}$ ($T_{s3}$ and $T_{s2}$) electromagnetically coupled with each of the output windings are provided. Connection of theses secondary windings is such that rectified pulse voltages produced in the secondary windings via diodes D11, D14 (D13, D12) are applied as trigger pulses to the gate electrodes G1 through G4 each of the thyristors S1 through S4 included in the inverter circuit 2 in such a combination as shown in the figure. Diodes D15 and D16 each reversely connected to the collector output windings $T_{p1}$ and $T_{p2}$ are added as necessary in a view to suppressing self-maintaining excitation which occurs immediately after the turning-off of the corresponding transistor Q3 and Q4, as is well known. The circuit configuration which has been described above is a well-known prior art.

This invention is characterized in that a constant voltage control circuit which operates so as to automatically suppress, at all times, variations in supply voltage to the load L due to fluctuations in the a-c output level of the generator proper G, and a multiple voltage changeover device capable of driving the load with several voltages to permit the generator unit to be used, for example, in various countries in the world are added to the generator circuit of such construction as described above.

Figure 2:
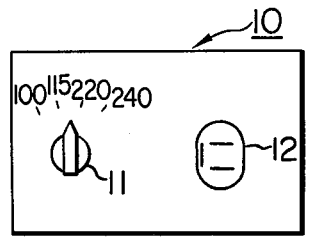
FIG. 2 is a schematic plan view of the adapter panel front of the voltage regulating device embodying this invention.
Figure 2:
Figure 2:
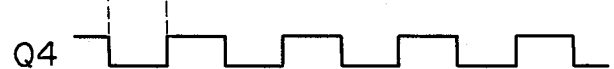
Figure 2:
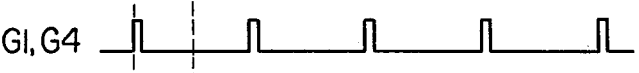
Figure 2:
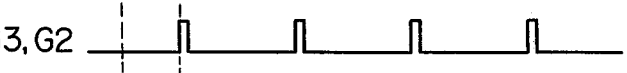
Figure 2:
Figure 2:
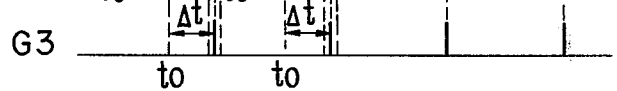

That is, a controlling and rectifying circuit which uses the output voltage to be applied to the load L as its input, for example, a second bridge rectifier circuit 4 using four diodes D17 through D20 is first provided, and a d-c voltage power supply 5 is constructed by connecting a smoothing capacitor C12 between the connection of two series resistors R9 and R10 connected between the output terminals of the rectifier circuit 4 to form a voltage divider circuit. Movable contacts of two gang changeover switches W1 and W2 having the desired number (4 in this embodiment) of fixed contacts corresponding to the number of load voltages to be changed over (4 types, i.e., 240 V, 220 V, 115 V and 100 V, of voltages are now in use as the load voltage of a generator in major countries in the world, as shown in FIG. 2) are connected to the ungrounded positive terminal of the d-c power supply 5, or the connection of the voltage dividing resistors mentioned above, via the series circuit of a zenar diode $D_{z1}$ and a diode D21 of polarity shown in the figure.

Each fixed contact of the changeover switches W1 and W2 is connected to one end each of four resistors R11, R12, R13 and R14 (R21, R22, R23 and R24) having different resistance values determined by the set value of generator load voltage, as will be described in detail, the other end each of the resistors R11, R12, R13 and R14 (R21, R22, R23 and R24) being grounded via capacitors C13 (C14). As will be evident from the following description, the changeover switches W1 and W2, and the circuit consisting of four resistors R11 through R14 (R21 through R24) one end each of which is connected to each of the fixed contacts of the changeover switches and the other end each of which is connected in common act as the multiple voltage changeover devices 6 and 7 of this invention. The parallel circuit components of two series-connected circuits comprising any of the four selectively changeable resistors R11 through R14 (R21 through R24) and the corresponding capacitor C13 (C14) between the cathode of the diode D21 and the grounded point constitute integration circuits 8 and 9, that is, a delay circuit acting as the constant voltage control portion of this invention for suppressing and controlling automatically variations in the level of supply voltage to the load L due to variations in the a-c output level of the generator proper G, as will be described later. Thus, the connections of each resistor and capacitor of the integration circuits 8 and 9 are connected to the collectors of the corresponding transistor Q1 (Q2) via the diode D22 (D23) of polarity shown in the figure, and are grounded via the series circuit consisting of the anode/cathode path of a switching element having a forward connected main current path, for example, a programmable unijunction transistor PUT1 (PUT2) and the primary winding $T_{1p}$ ($T_{2p}$) of trigger transformer T1 (T2). On the other hand, the trigger electrode of the switching element PUT1 (PUT2) is connected to the corresponding connection of two series resistors R15 and R16 (R17 and R18) connected between the terminals of the power supply via forward connected diode D24 (D25). Rectified pulse voltages produced in the trigger transformer secondary winding $T_{1s}$ ($T_{2s}$) electromagnetically coupled with the trigger transformer primary winding $T_{1p}$ ($T_{2p}$) via the diode D26 (D27) are applied to the gate electrode G1(G3) of the thyristor S1 (S3) in the inverter circuit 2, as shown in the figure.

Next, the operation of the circuit of such construction above will be described, referring to FIG. 3 a through k.

When the circuit components of this invention, that is the abovementioned multiple voltage changeover circuits 6 and 7 and the constant voltage control circuits 8 and 9 are not provided, the transistor Q3 (Q4) in the multivibrator circuit 3 alternately produces square wave oscillation outputs as shown in FIG. 3 a and b at a predetermined frequency through an intermittent on-off operation controlled by the time constant determined by the product of the capacitance value of the coupling capacitor C8 (C9) and the resistance value of the base resistor $R_{b1}$ ($R_{b2}$) of the corresponding transistor Q1 (Q2), as is easily understood by persons skilled in the art. At the start of each ON period of the transistor Q3, trigger pulses as shown in FIG. 3c, consisting of the rectified output produced in the secondary windings $T_{s1}$ and $T_{s2}$ coupled with the collector output winding $T_{p1}$, are applied to the gate electrodes G1 and G4 of the corresponding thyristors S1 and S4 in the inverter circuit 2, bringing the thyristors S1 and S4 simultaneously into conduction. As a result, a first load current $i_{L1}$ flows in the direction shown by a solid line arrow in FIG. 1 via the load L. Similarly, at the start of the ON period of the transistor Q4, trigger pulses as shown in FIG. 3d, consisting of the rectified output produced in the secondary windings $T_{s3}$ and $T_{s4}$ coupled with the collector output winding $T_{p2}$ are applied to the gate electrodes G3 and G2 of the corresponding thyristors S3 and S2 in the inverter circuit 2, bringing the thyristors S3 and S2 simultaneously into conduction, and at this time, the thyristors S1 and S4 are simultaneously reverse biased by the counterelectromotive forces induced in the upper half of the commutating reactor L1 and the lower half of the commutating reactor L2, and are forcibly turned off and kept in non-conduction.

Figure 3H:
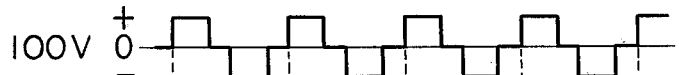
Figure 3I:
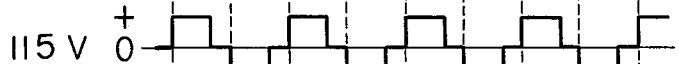
Figure 3J:
Figure 3K:

As a result, a second current $i_{L2}$ flows in the opposite direction to the first load current $i_{L1}$ as shown by a broken line arrow in FIG. 1. Thus, a drive voltage of a waveform as shown in FIG. 3e is applied to the load L as similar operations are alternately repeated. The operation described above is of public knowledge. When a constant voltage control circuit for stabilizing variations in the supply voltage to the load L due to variations in the a-c output level of the generator proper G and a multiple voltage changeover device for selectively driving loads of varied driving voltages are incorporated in a generator circuit based on the abovementioned operation, the constant voltage control circuit and the multiple voltage changeover device have to be constructed independently. This results in a relatively complicated circuit configuration and high equipment cost.

Now, the multiple voltage changeover devices 6 and 7 and the constant voltage control circuits 8 and 9 constructed of integration circuits acting as delay circuits, both embodying this invention will be described in what follows. That is, when the device of this invention is used, the gang changeover switches W1 and W2 in the multiple voltage changeover device are changed over in accordance with the drive voltage of a load to be driven while the load is connected to the predetermined connecting terminals. FIG. 2 shows an outline of the panel front of the adapter 10 of this invention constructed for such a purpose. In the figure, a changeover knob 11 for switching the gang changeover switches W1 and W2 in the multiple voltage changeover devices 6 and 7 and a jack receptacle 12 for connecting plug terminals of a given load to be driven are installed on the panel.

Now, assuming that there are four tyoes of loads to be driven, for example, 240 V, 220 V, 115 V and 100 V, and that a 100-V load is selected as a load to be driven, the 100-V load is connected to the jack receptacle 12 and the changeover knob 11 is set to the 100-V position to set the contact connections of the gang changeover switches W1 and W2 in the multiple voltage changeover devices 6 and 7 to the position of a resistor having the lowest resistance value, for example, R11 (R21) among four resistors R11 through R14 (R21 through R24). By doing this, the integration circuits 8 and 9 comprising the constant voltage control circuit is constructed of each series circuit of the selected resistor R11 (R21) and the integrating capacitor C13 (C14). The charge voltage level of the integrating capacitor C13 (C14) in the integration circuits 8 and 9 is set to almost zero because the diode D22 (D23) remains in the forward biased state during the period when the corresponding transitor Q1 (Q2) in the multivibrator circuit 3 remains conducting. Consequently, the corresponding trigger transformer T1 (T2) is not energized at all. The charge voltage level of the integrating capacitor C13 (C14) gradually increases as time elapses starting an instant when the corresponding transistor Q1 (Q2) in the multivibrator circuit 3 is brought to non-conduction, in other words, when the opposite side transistor Q2 (Q1) is brought to conduction. When the charge voltage level of the integrating capacitor C13 (C14) reaches a predetermined level after the lapse of a predetermined time determined by the product of the resistance value of the corresponding integrating resistor R11 (R21) and the capacitance value of the corresponding integrating capacitor C13 (C14), the corresponding switching element PUT1 (PUT2) is triggered to turn on, causing a pulse current to flow in the corresponding trigger transformer T1 (T2). Therefore, assuming that the thyristors S1 and S4 in the inverter circuit 2 are in the conduction state, selection of the integration time constants of the integration circuits 8 and 9 at an appropriate value makes it possible to flow a pulse current in the trigger transformer T2 every time an appropriate time $\Delta t$ elapses, starting from the time for the thyristors S1 and S4 to start conducting (or starting from an instant when the opposite side thyristors S3 and S2 are switched from the conducting state to the non-conducting state), as shown in FIG. 3 f. And, by doing this, the thyristor S3 is triggered to turn on every time the time $\Delta t$ elapses after the thyristors S1 and S4 start conducting during the conducting period of the thyristors S1 and S4. During the period when the thyristor S3 is turned on, as is well known, reverse voltages of the same level and of reverse polarity with each other are induced in the upper and lower halves of the commutating reactor L2, bringing about a reverse biased state between the anode and cathode of the thyristor S4. This forcibly turns off the thyristor S4, together with the thyristor S1, and forcibly cuts off the supply of the first load current $i_{L1}$ to the load L (refer to FIG. 3 g).

On the other hand, the trigger transformer T1 performs the same operation as the trigger transformer T2 during the period when the thyristors S3 and S2 in the inverter circuit 2 are in the conducting state, causing the thyristor S1 to be triggered every time the time $\Delta t$ elapses, starting from the time $t_0$ for the thyristors S3 and S2 to start conducting. This forcibly turns off the thyristors S3 and S2 and thereby forcibly cuts off the second load current $i_{L2}$.

Assuming that the resistors R11 and R21 are selected by the gang changeover switches W1 and W2 in the state described above, the terminal voltage of the load L is properly controlled at the level of 100 V even when the terminal voltage deviates from 100 V. That is, assuming that the terminal voltage increases from 100 V, the charge current to the integrating capacitor C13 (C14) increases by that increment, causing the time $\Delta t$ to decrease and thereby the conduction time of the load current $i_{L2}$ ($i_{L1}$) to decrease. Thus, the control function is effected to decrease the terminal voltage of the load L to 100 V.

On the contrary, when the terminal voltage of the load L decreases for some reason or other, the time $\Delta t$ is increased, and thereby the terminal voltage of the load L is increased to 100 V.

Assuming that the resistor R12 (R22) is selected by the gang changeover switches W1 and W2, the charge current to the integrating capacitor C13 (C14) is decreased by the resistance value of the resistor R12 (R22), causing the time $\Delta t$ to increase. Thus, the terminal voltage of the load L is switched to 115 V, as is evident by comparing FIG. 3 h and FIG. 3 i. Even if the load voltage deviates from 115 V in that state, control is effected to maintain the load voltage at 115 V, as in the case of 110 V. Similarly, when the resistors R13 (R23) and R14 (24) are selected by the gang changeover switches W1 and W2, the terminal voltage of the load L is set to 220 V and 240 V and voltage control is properly effected, as in the case of 100 V.

As is evident from the above description, this invention makes it possible to select the load voltage at a desired level, for example, 100 V, 115 V, 220 V and 240

V, merely changing over the time constants of the integration circuits 8 and 9 which act as automatic constant voltage control circuits of the load voltage variations due to variations of the a-c output level of the generator proper. In addition, adoption of a construction in which zenar diode DZ1 is connected in series in the integration circuits 8 and 9, enables the terminal voltage of the integrating capacitor C13 (C14) to increase linearly, rather than as a function of time, thus facilitating the selection of the load voltage.

It is needless to say that this invention is not limited to the construction as described above, but can be applied with equal utility to all such modifications as essentially fall within the technical thought of this invention. For, example, the thyristors S1 through S4 in the inverter circuit 2 and the switching elements PUT1 and PUT2 may be replaced with other elements capable of performing equivalent operations. In place of the integration circuits 8 and 9, other suitable delay control elements such as timers may be used in the same manner as in the abovementioned embodiment to achieve similar results.

What is claimed is:

1. A voltage regulating device for power generating system having a generator; a rectifier for rectifying the output of the generator; an inverter circuit incorporating two sets of switching elements which are provided on the output side of the rectifier and alternately turned on and off; a load which is energized by the inverter circuit; and multivibrators for controlling the switching elements of the inverter circuit, characterized in that there are provided delay circuits for controlling a delay time in accordance with the load voltage; and at least one diode respectively connected between a multivibrator and a delay circuit such that the delay operation of said circuits begin at the point of time when said multivibrators respectively generate a trigger pulse; and said sets of switching elements of the inverter circuits are controlled by both trigger pulses from said multivibrators and trigger pulses from said delay circuit to make the supply voltage to the load constant by forcibly turning off each set of the switching elements by means of the trigger pulses from said delay circuits prior to their turning off by means of the trigger pulses from said multivibrator respectively during each half cycle of the supply voltage.

2. A voltage regulating device for power generating system as set forth in claim 1 wherein a multiple voltage changeover device is provided in the delay circuit so as to selectively supply multiple regulated voltages to the load.

3. A voltage regulating device for power generating system as set forth in claim 1 wherein the inverter circuits comprise parallel square wave thyristor inverter circuits connected to the rectified power source of the a-c output of the generator proper.

4. A voltage regulating device for power generating system as set forth in claim 2 wherein the multiple voltage changeover device comprises multiple-contact switches the travelling contacts of which are connected to an end of the rectified power source of the a-c output of the generator to be applied to the load, and a plurality of resistors of different resistance values each of which is individually connected to each fixed contact of the changeover switches.

5. A voltage regulating device for power generating system as set forth in claim 1 wherein the delay circuits comprise integration circuits.

* * * * *